United States Patent
Jang et al.

(10) Patent No.: US 7,218,045 B2
(45) Date of Patent: May 15, 2007

(54) PLANAR LIGHT GENERATING DEVICE AND DISPLAY DEVICE HAVING THE SAME

(75) Inventors: Hyeon-Yong Jang, Osan-si (KR); In-Sun Hwang, Suwon-si (KR); Hac-Il Park, Seoul (KR); Sang-Yu Lee, Yongin-si (KR); Joong-Hyun Kim, Yongin-si (KR); Jin-Seob Byun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 128 days.

(21) Appl. No.: 11/039,576

(22) Filed: Jan. 19, 2005

(65) Prior Publication Data

US 2005/0264231 A1 Dec. 1, 2005

(30) Foreign Application Priority Data

May 29, 2004 (KR) .................. 10-2004-0038648

(51) Int. Cl.
*H01J 17/16* (2006.01)
(52) U.S. Cl. .................. 313/234; 313/607; 315/169.3
(58) Field of Classification Search ................ 313/234, 313/607; 315/323
See application file for complete search history.

(56) References Cited

U.S. PATENT DOCUMENTS 6,294,867 B1 * 9/2001 Lynn .......................... 313/422
6,943,506 B2 * 9/2005 Moon ......................... 315/323

* cited by examiner

*Primary Examiner*—David Vu
(74) *Attorney, Agent, or Firm*—Cantor Colburn LLP (57) ABSTRACT

A light generating device includes a body having discharge spaces generating light in response to a voltage signal, and electrodes providing the voltage signal to the discharge spaces. The discharge spaces are apart from each other and arranged substantially parallel with each other. The electrodes are disposed at external portions of the body. The body includes a first substrate, and a second substrate disposed on the first substrate. The second substrate includes space forming members and space dividing members. The discharge spaces are each formed between corresponding one of the space forming members and the first substrate. The space dividing members are each disposed between the adjacent space forming members. The space dividing members include connecting passages each connecting adjacent ones of the discharge spaces. A display device includes a display panel for displaying images using an image signal, a driving signal and light, the planar light generating device for providing the light to the display panel, and an inverter for generating the voltage signal to the planar light generating device.

35 Claims, 7 Drawing Sheets

PLANAR LIGHT GENERATING DEVICE AND DISPLAY DEVICE HAVING THE SAME

BACKGROUND OF THE INVENTION

1. Field of the Invention

The present invention relates to devices for displaying images, and more particularly, to a device for generating planar light and an image display device having the planar light generating device.

2. Description of the Related Art

Liquid crystal display (LCD) devices are one of the types of the image display devices. Since the LCD devices have advantageous properties such as small thickness, low driving voltage, low power consumption, etc., they have been widely used for displaying images.

The LCD devices display images using liquid crystal, and it is necessary to externally provide light to the liquid crystal in an LCD device. Accordingly, the LCD devices generally have a backlight assembly to generate light to the liquid crystal.

Conventional backlight assemblies include a cold cathode fluorescent lamp (CCFL) having a tubular shape. The CCFLs may be classified into edge illumination type CCFLs and direct illumination type CCFLs. In an LCD device employing the edge illumination type CCFL(s), one or two edge illumination type CCFLs are disposed on edge portions of a light guide plate having a reflecting layer so as to supply light to an LCD panel. In an LCD device employing the direct illumination type CCFL, the direct illumination type CCFL is disposed under the light guide plate. A reflection plate and a diffusion plate are disposed under the direct illumination type CCFL and on the light guide plate, respectively, so as to supply light to an LCD panel.

A conventional backlight assembly includes optical members, such as the light guide plate or the diffusion plate, so that the optical members absorb a portion of the light. As a result, luminance of the light generated from the backlight assembly is decreased. Also, uniformity of the luminance is decreased. In addition, since the conventional backlight assemblies have a complex structure, their manufacturing cost increases.

Planar light generating devices have been developed to solve the above mentioned problems. The planar light generating devices generally include a body and electrodes. The body includes discharge spaces disposed adjacent to one another. A discharge voltage is applied to the body through the electrodes. The discharge spaces are connected to one another so that distribution of a discharge gas in the discharge spaces may be uniformized. The discharge voltage is applied to the electrodes to form a plasma discharge in the discharge spaces, thereby generating the light.

When the plasma discharge is formed in the discharge spaces, current may flow through the discharge spaces so that a voltage drop is formed in each of the discharge spaces. The amount of the voltage drop is substantially equal to the current multiplied by a square of a resistance of each of the discharge spaces. The resistances of the discharge spaces are different from one another, so that the voltage drops of the discharge spaces are different from one another. The difference between the voltage drops form a potential difference between the discharge spaces, so that a portion of the current may be concentrated on one of the discharge spaces, thereby forming a channeling of the current. The channeling of the current deteriorates the luminance, and the uniformity of the luminance may also be decreased. As a result, image display quality of the LCD device is lowered.

BRIEF SUMMARY OF THE INVENTION

The above mentioned and other drawbacks and deficiencies of the prior art are overcome or alleviated by a light generating device and a display device employing the same according to the present invention. In one embodiment, a device for generating light comprises a body having discharge spaces that generate light in response to a voltage signal, in which the discharge spaces are apart from each other at a selected distance, electrodes that provide the voltage signal to the discharge spaces, in which the electrodes are disposed at external portions, respectively, of the body, and space diving members being each disposed between the adjacent discharge spaces. The space dividing members include connecting passages each of which connects the adjacent discharge spaces. The discharge spaces are arranged substantially parallel with each other, and the adjacent discharge spaces are apart from each other at a first distance.

The body includes a first substrate, and a second substrate disposed on the first substrate. The second substrate includes space forming members that are disposed on the first substrate and have a shape such that each space forming member and the first substrate defines each discharge space, and the space dividing members that are in contact with the first substrate, in which the space dividing members are each disposed between adjacent ones of the space forming members. The space forming members each form a hollow column on the first substrate, so that the discharge spaces each have a hollow column shape. The space dividing members each have a first width substantially equal to the first distance. The space forming members each have a second width larger than the first width.

Each of the space dividing members includes one or more connecting passages. The connecting passages are each disposed in a diagonal direction with respect to a longitudinal direction of the discharge spaces. The connecting passages are each disposed at a center portion in a longitudinal direction of the respective space dividing members. The electrodes are disposed on an exterior surface of the space forming members and have a substantially identical width. The electrodes each have a varying width such that a width at a center portion of the electrodes is smaller than a width at a side portion of the electrodes.

In another embodiment, an image display device includes a display panel that displays images using an image signal, a driving signal and light, the light generating device that provides the light to the display panel, and an inverter that generates the voltage signal to the planar light generating device. The image display device also includes a container that receives the planar light generating device, an optical member disposed between the container and the display panel, and a fixing member that securely holds the display panel in the container.

These and other features and advantages of the present invention will become apparent from the following detailed description of illustrative embodiments thereof, which is to be read in connection with the accompanying drawings.

The present application claims priority from Korean Patent Application No. 2004-38648, filed on May 29, 2004, the disclosure of which is hereby incorporated herein by reference in its entirety.

BRIEF DESCRIPTION OF THE DRAWINGS

The above and other advantages of the present invention will become more apparent by describing in detail exemplary embodiments thereof with reference to the accompanying drawings, in which.

DETAILED DESCRIPTION OF THE INVENTION

It should be understood that the exemplary embodiments of the present invention described below may be modified in different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Hereinafter, the present invention will be described in detail with reference to the accompanying drawings.

Figure 1:
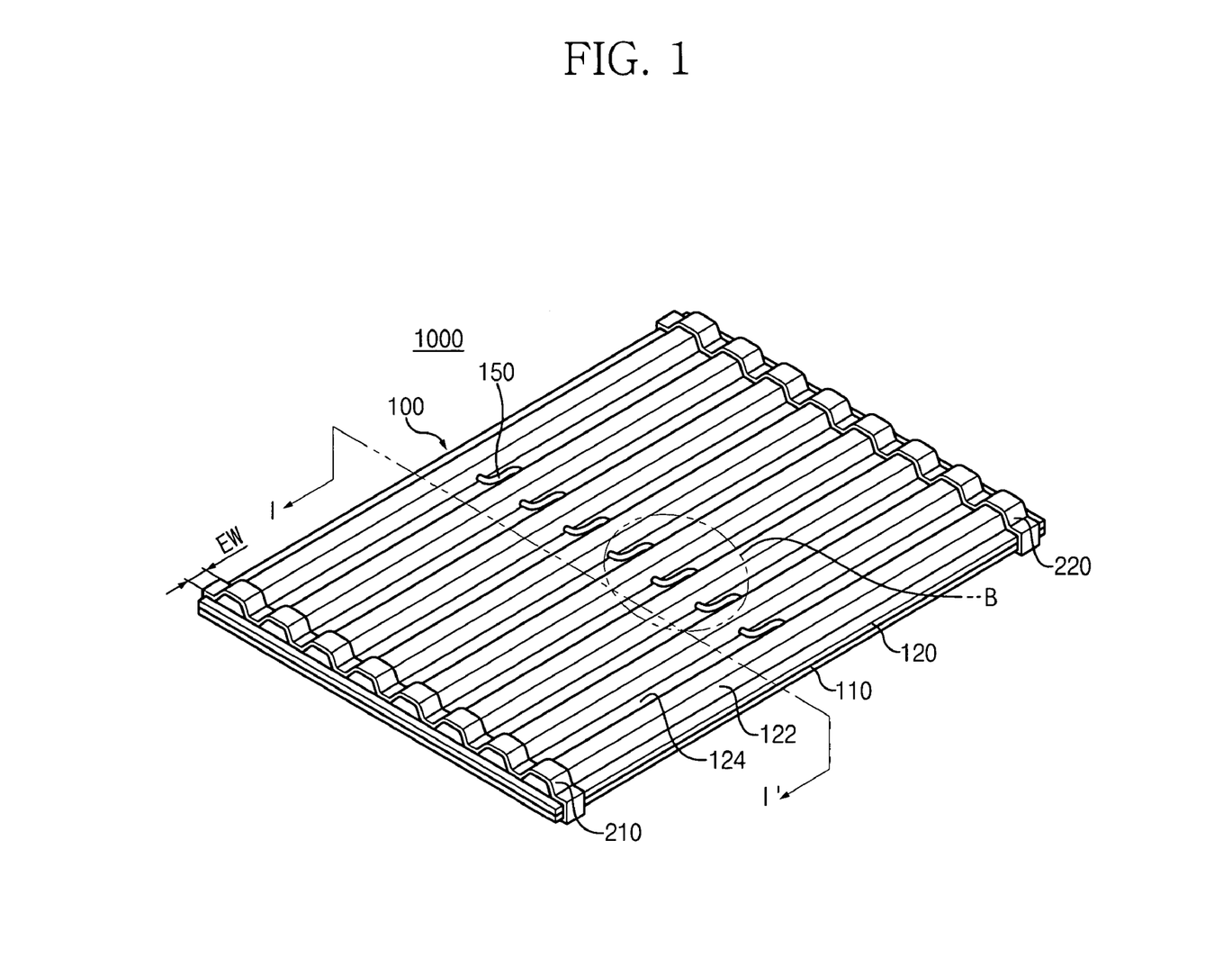
FIG. 1 is a perspective view of a planar light generating device in accordance with an exemplary embodiment of the present invention.
Figure 2:
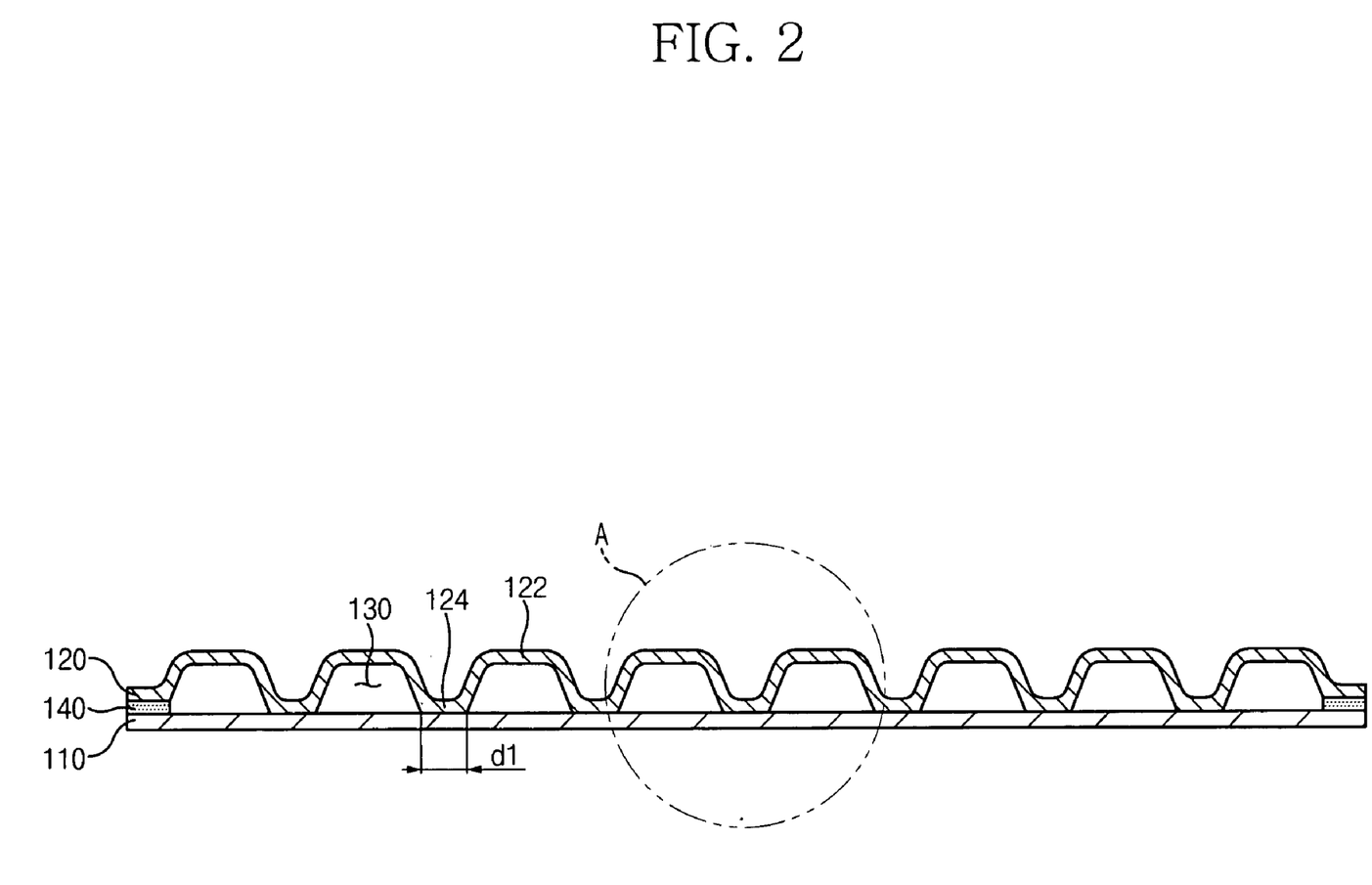
FIG. 2 is a cross-sectional view of the body taken along line I–I' in FIG. 1.
Figure 3:
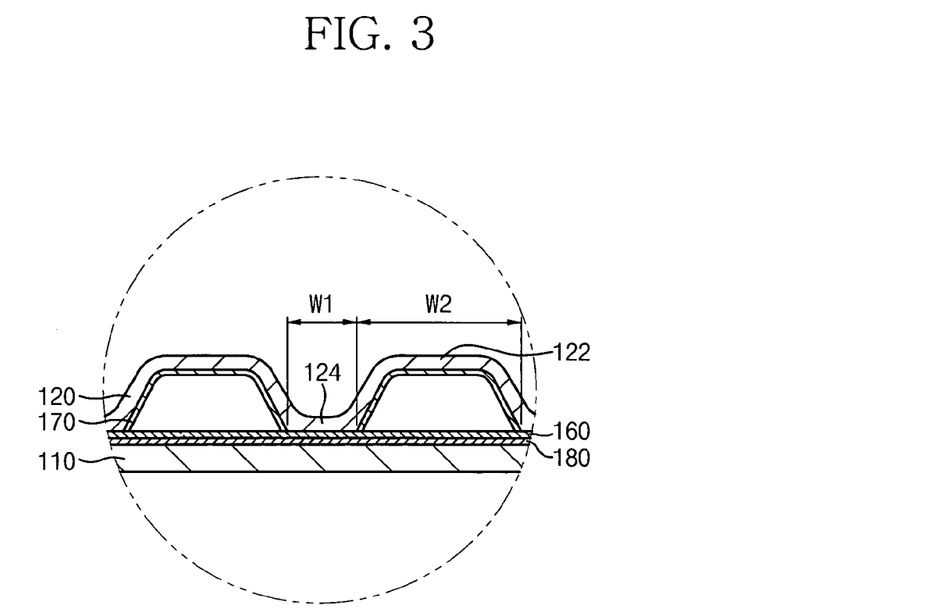
FIG. 3 is an enlarged cross-sectional view of portion "A" in FIG. 2.

FIG. 1 is a perspective view showing a planar light generating device in accordance with an exemplary embodiment of the present invention. FIG. 2 is a cross-sectional view taken along line I–I' in FIG. 1. FIG. 3 is an enlarged cross-sectional view of portion "A" in FIG. 2.

Referring to FIGS. 1 to 3, the planar light generating device 1000 includes a body 100 and electrodes 210 and 220 each disposed at a selected region of the body. In this embodiment, the planar light generating device 1000 has first and second electrodes 210 and 220 disposed at opposite sides, respectively, of the body 100.

The body 100 includes first and second substrates 110 and 120 facing each other. The first substrate 110 has, for example, a rectangular plate shape. The first substrate 110 may include transparent glass, through which visible light passes and ultraviolet light is blocked.

The second substrate 120 includes a plurality of space forming members 122. The second substrate 120, for example, is molded to have the space forming members 122. The space forming members 122 are spaced apart from each other at a selected distance. The space forming members 122 each have a column shape to form a hollow column together with the first substrate. In other words, the space forming members 122 each have the opposite longitudinal edges in contact with the first substrate and the remaining region spaced apart from the first substrate so as to define a discharge space having a shape of the hollow column. Thus, the first and the space forming members 122 of the second substrate define the discharge spaces, as shown in FIG. 2, into and from which discharge gas is injected and air exhausted. The discharge spaces are disposed on a coplanar surface, i.e., the surface of the first substrate. In this embodiment, the space forming members 122 have a substantially identical length and are arranged substantially parallel with each other. The space forming members 122 are spaced apart from one another at a first distance d1. The first distance d1 is a distance to effectively prevent electromagnetic interference between the adjacent space forming members 122. The second substrate 120 may include the transparent glass.

Space dividing members 124 are each formed between adjacent ones of the space forming members 122 that are spaced apart from one another. The space dividing members 124 are in contact with the first substrate 110. The space dividing members 124 have a substantially identical width, a first width W1, as shown in FIG. 3. The space forming members 122 also have a substantially identical width, a second width W2. The first width W1 of the respective space dividing members 124 is, for example, substantially equal to the first distance d1 between adjacent ones of the space forming members 122. The first width W1 of the respective space dividing members 124 is, for example, smaller than the second width W2 of the respective space forming members 122.

The second substrate 120 may be formed by means of a molding process. For example, a base substrate of a plate shape is heated, and the heated base substrate is molded to form the second substrate 120 having the space forming members 122 and the space dividing members 124.

Although the space forming members 122 have a cross-sectional view of a trapezoidal shape in this embodiment, the shape of the space forming members 122 or the discharge spaces 130 is not limited to one in this embodiment. Instead, the space forming members 122 may have a cross-sectional view of a different shape, such as a hemi-ellipsoidal shape, a semicircular shape, a rectangular shape, etc. The space dividing members 124 in this embodiment have a flat shape and a selected thickness.

In this embodiment, the body 100 of the planar light generating device 1000 includes an adhesive member 140 to combine the first and second substrates 110 and 120. The adhesive member 140 may include frit that is a mixture of glass powder and metal powder. The melting point of the frit is lower than that of the glass. The adhesive member 140 is coated on edge portions of the first substrate 110 or the second substrate 120 or both the substrates 110 and 120. The first and second substrates 110 and 120 are combined each other by means of the adhesive member 140 through a firing process. In this embodiment, the adhesive member 140 is disposed only at the edge portions of the substrates, not on the space dividing members 124.

The space dividing members 124 are in contact with the first substrate 110 by the atmospheric pressure. This is because the pressure in the discharge spaces 130 is lower than the atmospheric pressure. In other words, since the pressure in the discharge spaces 130 of this embodiment is about 50 Torr and the atmospheric pressure is about 760 Torr, a compressive force caused by the pressure difference between the pressure in the discharge spaces 130 and the atmospheric pressure applies to the outer surface of the second substrate 120, so that the space dividing members 124 make contact with the first substrate 110. Discharge gases injected into the discharge spaces 130 includes mercury (Hg), neon (Ne), argon (Ar), xenon (Xe), Krypton (Kr), etc.

The first width W1 of the space dividing members 124 is determined to prevent electromagnetic interference between the space forming members 122. When a distance between adjacent ones of the space forming members 122 (or the discharge spaces 130) is increased, the intensity of electromagnetic radiation between the adjacent space forming members 122 decreases. As a result, the electromagnetic interference between the space forming members 122 (or the adjacent discharge spaces 130) is effectively prevented or decreased, thereby decreasing a channeling.

When the first width W1 of the space dividing members 124 is increased to increase the distance between the space forming members 122 (or the discharge spaces 130), it may deteriorate the luminance uniformity of light generated from the planar light generating device 1000. In other words, since an increase in the first width W1 of the space dividing members 124 causes a decrease in the size of the space forming members 122 (or the discharge spaces 130), the luminance uniformity of the light is decreased. In this embodiment, the first width W1 of the space dividing members 124 is determined such that the electromagnetic interference between the space forming members 122 (or the discharge spaces 130) is prevented and the luminance uniformity of the light is increased.

For example, the first width W1 of the respective space dividing members 124 is no less than about 2 mm to prevent the electromagnetic interference between the discharge spaces 130. In addition, the first width W1 of the space dividing members 124 is no more than about 5 mm so that the luminance is uniformized. That is, the first width of the space dividing members 124 is in the range from about 2 mm to about 5 mm. The second width W2 of the space forming members 122 is larger than the first width W1 of the space dividing members 124. The second width W2 of the space forming members 122 is in the range from about 10 mm to about 12 mm.

As the space forming members 122 are spaced apart from one another by the first distance d1, the number of the space forming members 122 in the body 100 of a selected size may be reduced. When the body 130 has the reduced number of the space forming members 122 (or the discharge spaces 130) and a predetermined voltage is applied to the first and second electrodes 210 and 220, a discharge voltage applied to the respective discharge spaces 130 increases. As a result, the amount of current flowing the discharge spaces 130 increases, while the luminance of the light generated from the body 100 is not decreased. When the amount of the current flowing the discharge spaces 130 is increased during operation of the planar light generating device 1000, a temperature in the discharge spaces 130 increases. When the temperature in the discharge spaces 130 is increased, a dark spot of the body 100 is effectively prevented. The dark spot of the body 100 may be formed due to a decrease in the vapor pressure of mercury in the discharge spaces 130, when a planar light generating device is operated under a low temperature. In this embodiment, the planar light generating device 1000 operates in the increased temperature so that the dark spot is prevented.

The first and second electrodes 210 and 220 include high conductive material, for example, copper (Cu), nickel (Ni), silver (Ag), gold (Au), aluminum (Al), chromium (Cr), etc. The first and second electrodes 210 and 220 are formed, for example, through a spray coating process of metal powder that has the high conductive material. For example, a mask is disposed on the body to expose only the end portions of the body 100, at which the electrodes 210 and 220 are formed. The metal powder is sprayed on the body 100 using the spray coating process, and then the mask is removed to form the first and second electrodes 210 and 220. In a different embodiment, aluminum tape is attached on the edge portions of the body 100 to form the first and second electrodes 210 and 220. In another different embodiment, the first and second electrodes 210 and 220 are formed by means of a silver paste coating process.

The first and second electrodes 210 and 220 include transparent conductive material, for example, indium tin oxide (ITO), indium zinc oxide (IZO), zinc oxide (ZO), etc. When the first and second electrodes 210 and 220 include the transparent conductive material, the first and second electrodes 210 and 220 may be disposed on a portion of the body 100 corresponding to a display area of an LCD panel so as to prevent the dark spot. The discharge voltage, which is externally provided, is applied to the first and second electrodes 210 and 220 to form plasma in the discharge spaces 130.

It should be noted that although the planar light generating device 1000 of this embodiment includes the exterior electrodes 210 and 220 disposed outside the body 100, the planar light generating device of the present invention may have first and second interior electrodes disposed in the body.

In this embodiment, the first and second electrodes 210 and 220 surround the outer surfaces of the edge portions of the first and second substrates 110 and 120. In a different embodiment, the first and second electrodes 210 and 220 are formed on the outer surface of the edge portion of either the first substrate 110 or the second substrate 120.

Referring to FIG. 3, the body 100 includes a first fluorescent layer 160, a second fluorescent layer 170 and a reflecting layer 180. The first and second fluorescent layers 160 and 170 are formed on the inner surfaces of the first and second substrates 110 and 120, respectively. The ultraviolet light generated by the plasma discharge in the discharge spaces 130 passes through the first fluorescent layer 160 or the second fluorescent layer 170 to form the visible light. The reflecting layer 180 is disposed between the first substrate 110 and the first fluorescent layer 160. The visible light generated from the first fluorescent layer 160 or the second fluorescent layer 170 is reflected from the reflecting layer 180 so that the visible light is guided toward the second substrate 120. The visible light is prevented from leaking through the first substrate 110.

In a different embodiment, the body 100 includes a protection layer (not shown) formed between the first substrate 110 and the reflecting layer 180. The protection layer (not shown) prevents a reaction between the first and/or second substrate(s) 110 and/or 120 and the mercury in the discharge gas, so that loss of the mercury and occurrence of the dark spot are prevented.

The planar light generating device 1000 also includes connecting passages 150 each formed between adjacent ones of the space forming members 122 to connect the discharge spaces 130. In this embodiment, one connecting passage 150 is formed between the adjacent space forming members 122. In a different embodiment, however, multiple connecting passages are formed between adjacent ones of the space forming members 122.

Figure 4:
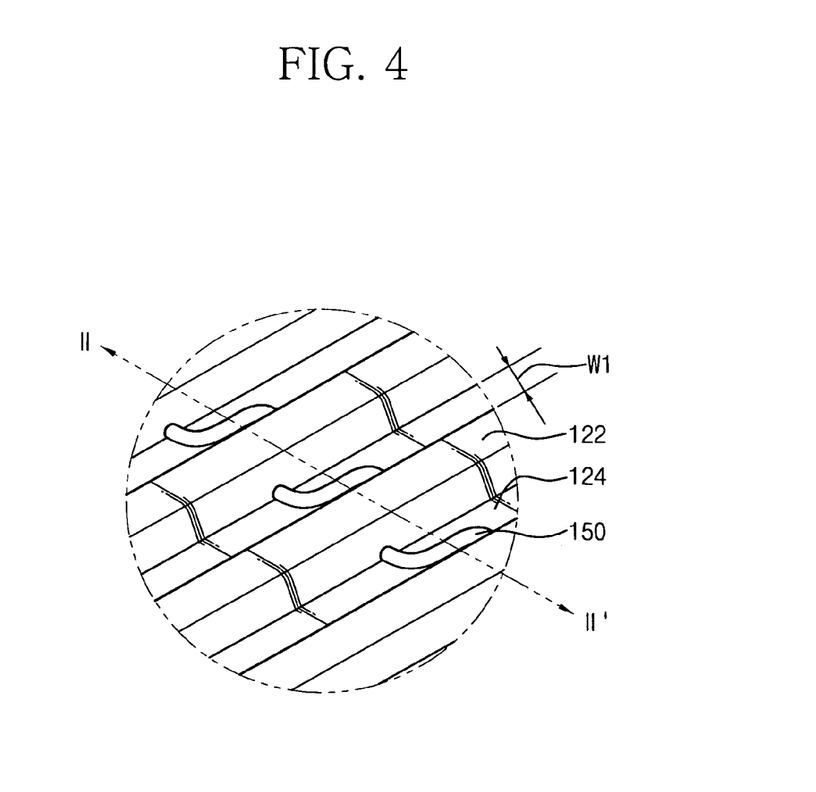
FIG. 4 is an enlarged perspective view of portion "B" in FIG. 1.
Figure 5:
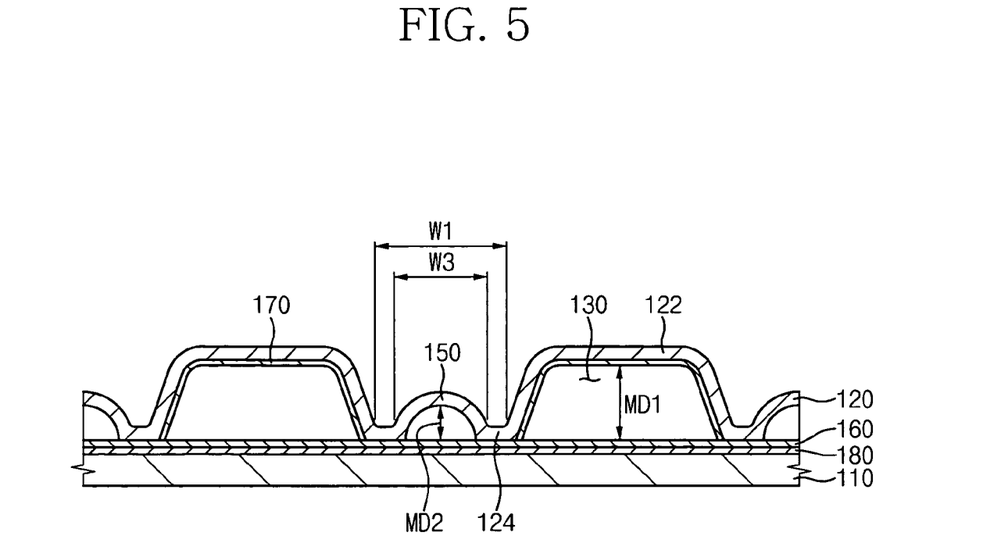
FIG. 5 is a cross-sectional view of the body taken along line II–II' in FIG. 4.

FIG. 4 is an enlarged perspective view of portion "B" in FIG. 1. FIG. 5 is a cross-sectional view of the body taken along line II–II' in FIG. 4. Referring to FIGS. 4 and 5, the connecting passages 150 are each formed at the respective space dividing members 124. The connecting passages 150 are each formed between adjacent ones of the space forming members 122 to connect corresponding ones of the discharge spaces 130. The discharge spaces 130 are connected with each other though the connecting passages 150, so that the discharge gas in one discharge space 130 may move into another discharge space 130. By the movement of the discharge gas between the discharge spaces 130, the discharge spaces 130 have a substantially uniform gas pressure.

In this embodiment, the connecting passages 150 are disposed in a diagonal direction with respect to the longitudinal direction of the discharge spaces 130. For example, the connecting passages 150 have a curved shape. As shown in FIG. 4, the connecting passages 150 each have an S-shape so that the length of the respective connecting passages 150 is larger than that of the connecting passages having a straight shape. The length of the respective connecting passages 150 is larger than the first width W1 of the respective space dividing members 124. In this embodiment, the connecting passages 150 each have a larger length, so that the current flowing the respective connecting passages 150 has a longer path. Owing to such a longer path of the current, the channeling effect is more effectively prevented in the planar light generating device of the present invention.

In this embodiment, the connecting passages 150 are each disposed at a central region of the respective space dividing members 124 in their longitudinal direction. The region where the respective connecting passages 150 are formed between adjacent ones of the space forming members 122, has a third width W3 that is smaller than the first width W1 of the respective space dividing members 124. For example, the third width W3 of the respective connecting passages 150 is in the range from about 1 mm to about 3 mm. The connecting passages 150 are each formed to be apart from the first substrate 110 at a selected distance. As shown in FIG. 5, the discharge spaces 130 each have a first height MD1 in a direction substantially vertical to the surface of the first substrate 110, and the connecting passages 150 each have a second height MD2 that is smaller than the first height MD1. For example, the second height MD2 of the respective connecting passages 150 is in the range from about 1 mm to about 2 mm. The above mentioned widths and heights of the components may be varied during the molding process.

Figure 6:
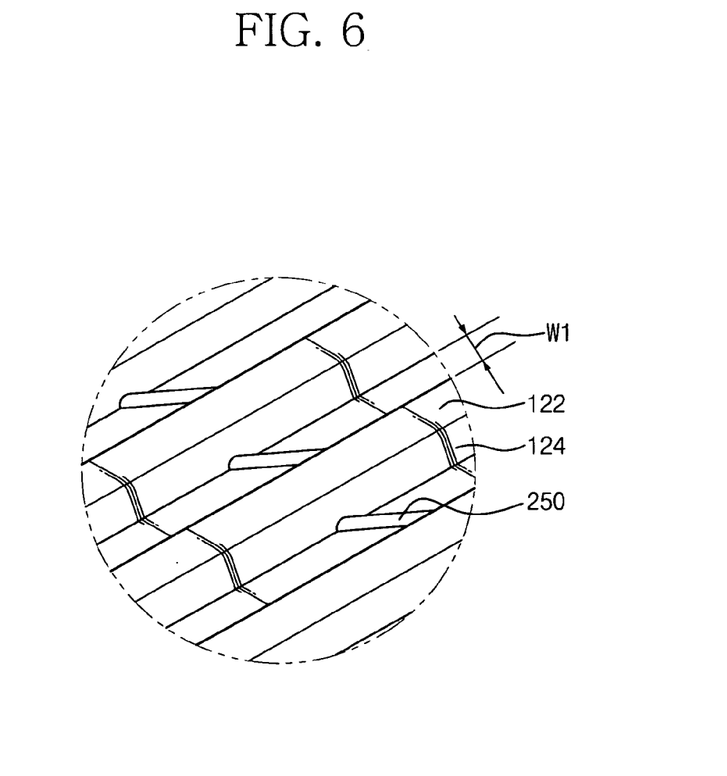
FIG. 6 is an enlarged perspective view of the connecting passages in accordance with another exemplary embodiment of the present invention.

FIG. 6 is an enlarged perspective view of a planar light generating device in accordance with another exemplary embodiment of the present invention. In FIG. 6, the same parts as those shown in FIG. 1 are represented with like reference numerals and their explanation will be omitted to avoid description duplication.

Referring to FIG. 6, the connecting passages 250 are each disposed in a diagonal direction with respect to the longitudinal direction of the space dividing members 124. Although one connecting passage 250 is formed at the respective space dividing members 124 in this embodiment, it is noted that two or more connecting passages may be formed at the respective space dividing members 124 in a different embodiment. Also, a modification may be conceived such that the connecting passages 250 would be disposed in a direction substantially perpendicular to the longitudinal direction of the space dividing members 124. A width of the respective connecting passages 250 is smaller than the first width W1 of the respective space dividing members 124. A height of the respective connecting passages 250 is smaller than the height of the respective discharge spaces. Since the connecting passages 250 are disposed in the diagonal direction, the length of the respective connecting passages 250 is longer than the first width W1 of the respective space dividing members 124.

In the above embodiments, the connecting passages 150 have the S-shape or the linear shape. However, the shape of the connecting passages 150 is not limited to those of the above embodiments. The connecting passages 150 may have other shapes in which the length of the respective connecting passages 150 is larger than the first width W1 of the respective space dividing members 124.

Figure 7:
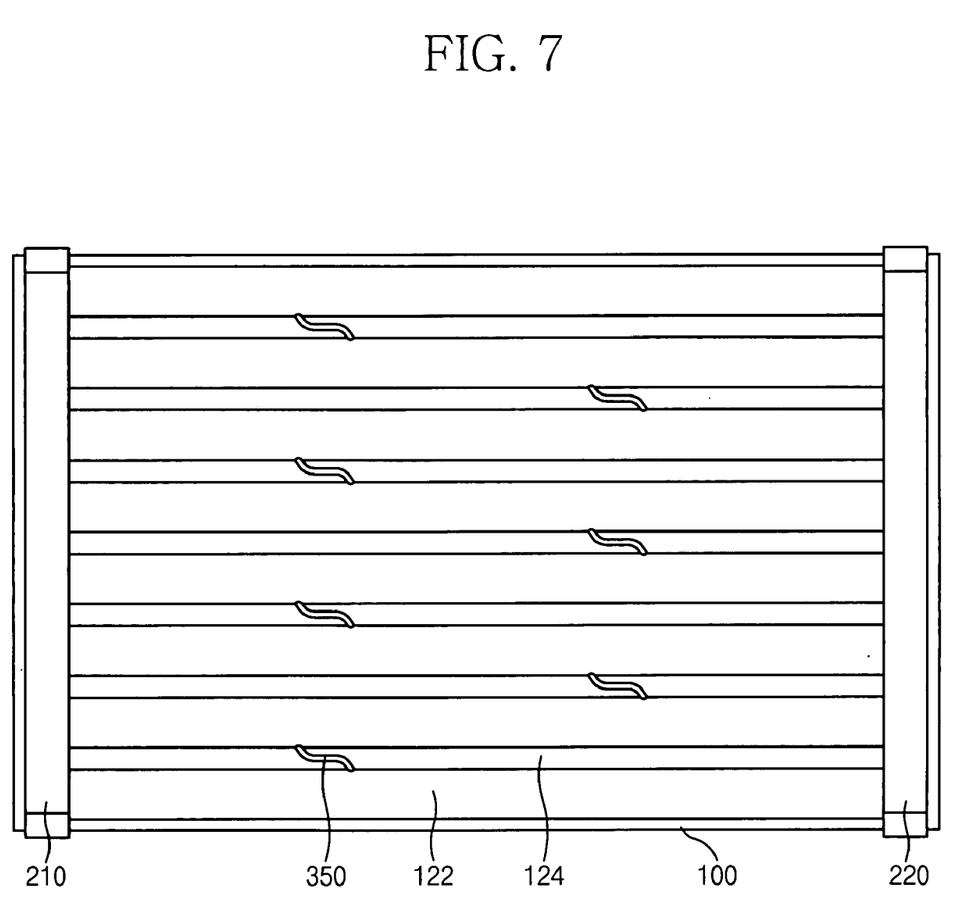
FIG. 7 is a plan view of a planar light generating device in accordance with another exemplary embodiment of the present invention.

FIG. 7 is a plan view of a planar light generating device in accordance with another exemplary embodiment of the present invention. In FIG. 7, the same parts as those shown in FIG. 1 are represented with like reference numerals and their explanation will be omitted to avoid description duplication.

Referring to FIG. 7, the planar light generating device includes connecting passages 350 each formed at each of space dividing members 124. In this embodiment, the connecting passages 350 are arranged in a zigzag pattern. For example, the odd numbered connecting passages 350 are disposed closer to the first electrode 210, and the even numbered connecting passages 350 are disposed closer to the second electrode 220. The zigzagged connecting passages 350 provide a longer movement path of the discharge gas in the discharge spaces. As a result, electromagnetic interference between the discharge spaces 130 is more effectively prevented.

In a different embodiment, two or more connecting passages are disposed at the respective space dividing members 124. In this case, the connecting passages may be arranged randomly. The connection passages 350 each have a linear shape, an S-shape, a zigzag shape, etc., and have a length larger than the width of the respective space dividing members 124.

Figure 8:
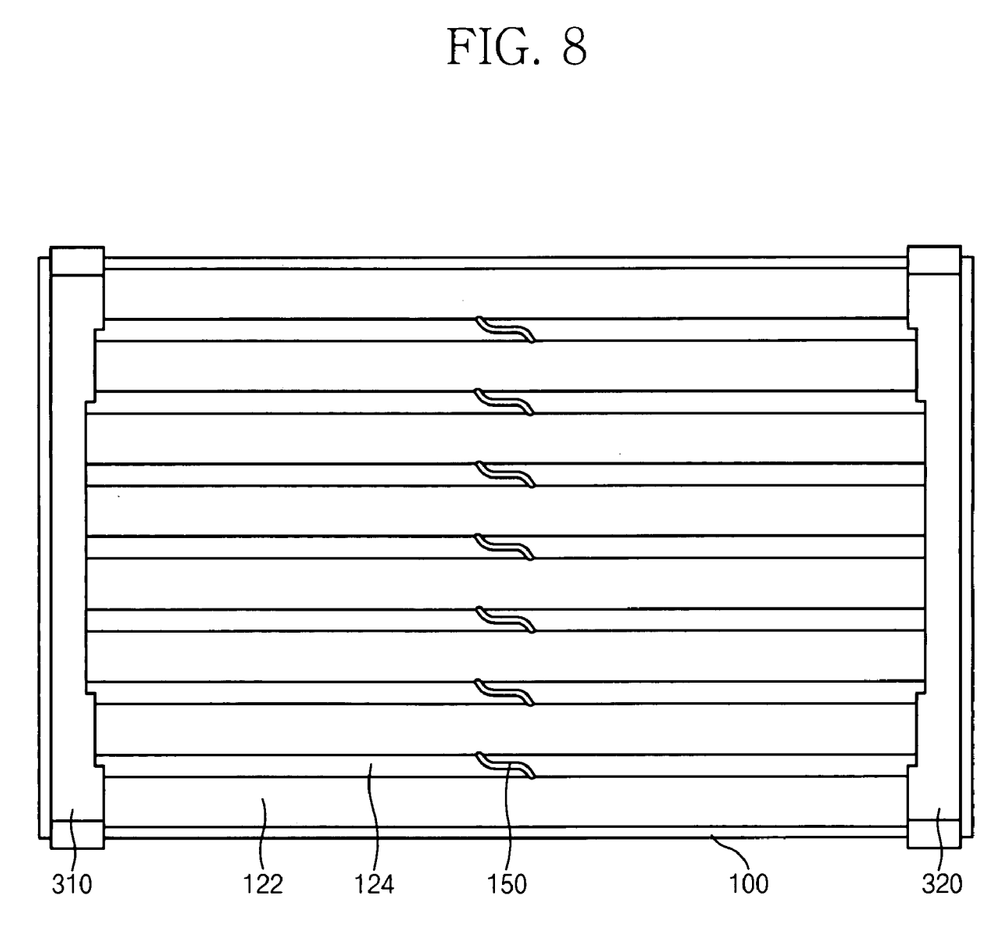
FIG. 8 is a plan view of a planar light generating device in accordance with another exemplary embodiment of the present invention.

FIG. 8 is a plan view of a planar light generating device in accordance with another exemplary embodiment of the present invention. In FIG. 8, the same parts as those shown in FIG. 1 are represented with like reference numerals and their explanation will be omitted to avoid description duplication.

Referring to FIG. 8, the planar light generating device includes first and second electrodes 310 and 320 disposed at the end portions of the body 100. The first and second electrodes 310 and 320 each have a varying width which varies along the longitudinal direction of the electrodes 310 and 320. In other words, each of the electrodes 310 and 320 has different widths depending on the measured positions. For example, the first and second electrodes 310 and 320 each have a width at its central portion corresponding to the central portion of the planar light generating device and different widths at its side portions corresponding to the side portions of the planar light generating device. The width at the central portion is smaller than the widths at the side portions. In this embodiment, the respective electrodes 310 and 320 have a varying width which becomes smaller at the central portion and larger at the side portions of the electrodes.

Assuming that the electrodes 310 and 320 have a width at the central portion which is equal to those at the side portions, luminance of the light generated from the central portion of the planar light generating device is higher than that of the light generated from the side portions of the planar light generating device. This is because the current flowing the discharge spaces at the side portions may leak due to electromagnetic interference between the discharge spaces at the side portions and other components of the planar light generating device or an LCD panel. In this embodiment, since the first and second electrodes 310 and 320 each have the varying width, the planar light generating device generates the light having substantially uniform luminance at the central and side portions.

The first and second electrodes 310 and 320 each have, for example, a stepwise shape as shown in FIG. 8. In this case, the region of the respective electrodes 310 and 320 corresponding to one or more discharge spaces at the central portion has the smallest width, and the region of the respective electrodes 310 and 320 corresponding to a discharge space next to the discharge spaces at the central portion has a larger width than that at the region corresponding to the central portion. Thus, the region of the respective electrodes 310 and 320 corresponding to the discharge space at the edge of the body has a largest width. The first and second electrodes 310 and 320 of this embodiment each have the width varying in such a stepwise manner. In another embodiment, the width of the respective electrodes varies in a linear manner. In other words, the inner side of the respective electrodes has a linearly curved shape.

The discharge spaces 130 may have different amounts of capacitance based on the width of the first and second electrodes 310 and 320. The amount of current flowing through the respective discharge spaces 130 is changed based on the capacitance in the respective discharge spaces 130. When the capacitance in a discharge space 130 is larger than others, the luminance of light generated from the discharge space 130 is also larger than the luminance of light generated from others. Thus, in this embodiment, the width of the electrodes 310 and 320 at the side portions is larger than that at the central portion such that the discharge spaces generate light having substantially uniform luminance. The width of the respective electrodes 310 and 320 is adjusted to have different values based on light emission characteristics of the planar light generating device to uniformize the luminance of the light generated from the planar light generating device. The first and second electrodes 310 and 320 may have various shapes based on the luminance difference between the luminance values at the central portion and the side portions of the planar light generating device.

Figure 9:
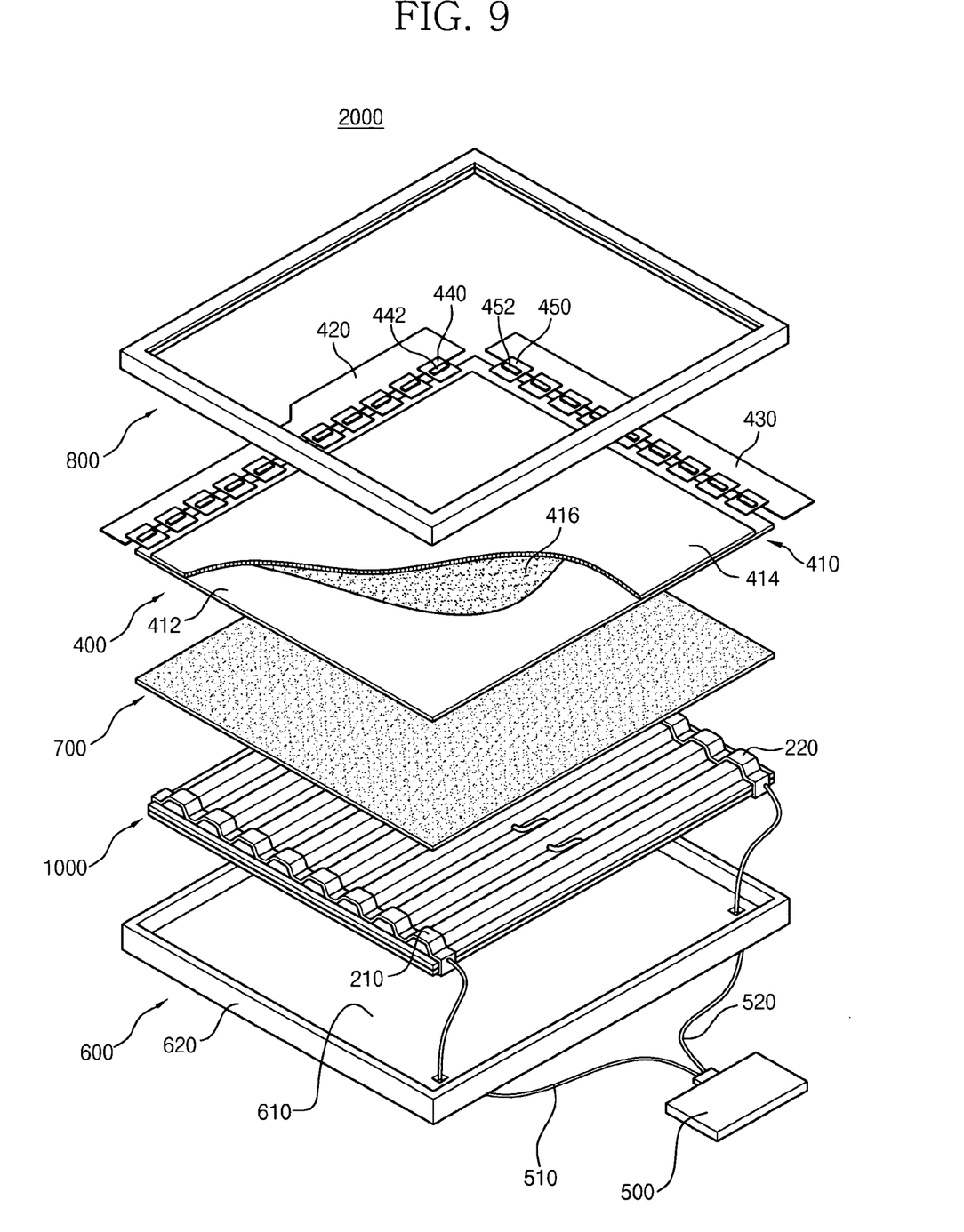
FIG. 9 is an exploded perspective view of an LCD apparatus in accordance with an exemplary embodiment of the present invention.

FIG. 9 is an exploded perspective view of an LCD apparatus according to an exemplary embodiment of the present invention. The LCD apparatus in FIG. 9 employs the planar light generating device shown in FIG. 1. In FIG. 9, the same parts as those shown in FIG. 1 are represented with like reference numerals and their explanation will be omitted to avoid description duplication.

Referring to FIG. 9, the LCD apparatus 2000 includes the planar light generating device 1000, a display unit 400 for displaying images, and an inverter 500 for generating a discharge voltage. The display unit 400 includes an LCD panel 410, a data printed circuit board (PCB) 420, and a gate PCB 430. The LCD panel 410 displays images. The data and gate PCBs 420 and 430 supply the LCD panel with a driving signal. The driving signal generated from the data and gate PCBs 420 and 430 is applied to the LCD panel 410 through a data flexible circuit film 440 and a gate flexible circuit film 450. The data and gate flexible circuit films 440 and 450 include a tape carrier package (TCP), a chip on film (COF), etc. The data and gate flexible circuit films 440 and 450 include a data driving chip 442 and a gate driving chip 452, respectively. The data and gate driving chips 442 and 452 control timing of the driving signal generated from the data and gate PCBs 420 and 440.

The LCD panel 410 includes two substrates and a liquid crystal layer 416 to display images. The liquid crystal layer 416 is disposed between the two substrates 412 and 414. The LCD panel 410 includes a thin film transistor (TFT) substrate 412, a color filter substrate 414 facing the TFT substrate 412, and the liquid crystal disposed between the TFT and color filter substrates 412 and 414.

The TFT substrate 412 includes a transparent glass plate and a plurality of TFTs (not shown) formed on the transparent glass plate. The TFTs (not shown) are arranged in a matrix form. A data line is electrically connected to a source electrode of each of the TFTs. A gate line is electrically connected to a gate electrode of each of the TFTs. A pixel electrode (not shown) having transparent conductive material is electrically connected to a drain electrode of each of the TFTs.

The color filter substrate 414 includes a red color filter (not shown), a green color filter (not shown), a blue color filter (not shown) and a common electrode (not shown). The red, green and blue color filters (not shown) may be formed through a coating process or a deposition process, etc. The common electrode includes the transparent conductive material.

When a gate voltage is applied to the gate electrode of the respective TFTs, the TFT is turned-on so that an electric field is formed between the pixel electrode and the common electrode. The arrangement of molecules of the liquid crystal 416 disposed between the TFT and color filter substrates 412 and 414 is changed in accordance with the electric field applied to the liquid crystal 416. When the arrangement of the liquid crystal molecules is changed, light transmittance of the liquid crystal 416 varies. The LCD panel 410 displays images using such optical characteristics of the liquid crystal.

The inverter 500 generates the discharge voltage to operate the planar light generating device 1000. The inverter 500 increases a level of a voltage signal that is externally provided to the inverter 500 to generate the discharge voltage to operate the planar light generating device 1000. The discharge voltage generated from the inverter 500 is applied to the first and second electrodes 210 and 220 of the planar light generating device 1000 through a first power supply line 510 and a second power supply line 520, respectively. For example, the discharge voltage includes a first discharge voltage and a second discharge voltage having an opposite phase to the first discharge voltage. The first discharge voltage has a substantially same level as the second discharge voltage. The first and second discharge voltages form alternating current.

The LCD apparatus further includes a receiving container 600, an optical member 700, and a fixing member 800. The receiving container 600 receives the planar light generating device 1000. The optical member 700 guides the light generated from the planar light generating device 1000. The fixing member 800 securely holds the LCD panel 410.

The receiving container 600 includes a bottom plate 610 and sidewalls 620. The planar light generating device 1000 is disposed on the bottom plate 610. The sidewalls 620 are perpendicularly extended at the edges of the bottom plate 610 to form a receiving space. The receiving container 600 may further include an insulating member (not shown) to insulate the receiving container 600 from the planar light generating device 1000.

The optical member 700 is disposed between the planar light generating device 1000 and the LCD panel 410. The optical member 700 guides the light generated from the planar light generating device 1000 toward the display unit 400. The optical member 700 allows the light to have a uniform distribution of luminance, and the luminance at the front of the LCD apparatus 2000 is increased. The optical member 700 includes a diffusion plate. The diffusion plate includes a plate shape having a predetermined thickness. The diffusion plate is spaced apart from the surface light 1000 by a predetermined distance. The optical member 700 may further include a brightness enhancement sheet disposed on the diffusion plate. The brightness enhancement sheet condenses the light that passes the diffusion plate to increase the luminance of the LCD apparatus 2000.

The fixing member 800 surrounds edge portions of the LCD panel 410 and combined with the receiving container 600, so that the LCD panel 410 is fixed onto the optical member 700. The fixing member 800 protects the LCD panel 410 from an external impact onto the LCD apparatus 2000. The fixing member 800 prevents the LCD panel 410 from being separated from the receiving container 600.

The present invention has been described with reference to the exemplary embodiments. It is, however, evident that many alternative modifications and variations will be apparent to those having skill in the art in light of the foregoing description. Accordingly, the present invention embraces all such alternative modifications and variations as fall within the spirit and scope of the appended claims.

What is claimed is:

1. A device for generating light, comprising:
   a body having discharge spaces that generate light in response to a voltage signal, the discharge spaces being apart from each other at a selected distance;
   electrodes that provide the voltage signal to the discharge spaces, the electrodes being disposed at external portions, respectively, of the body; and
   space dividing members being each disposed between adjacent ones of the discharge spaces, the space diving members including connecting passages each of which connects adjacent ones of the discharge spaces in fluid communication.

2. The device of claim 1, wherein the discharge spaces are arranged substantially parallel with each other, adjacent ones of the discharge spaces being apart from each other at a first distance.

3. The device of claim 2, wherein the first distance is equal to or larger than about 2 mm.

4. The device of claim 2, wherein the body includes:
   a first substrate; and
   a second substrate disposed on the first substrate, the second substrate including:
      space forming members that are disposed on the first substrate and have a shape such that each space forming member and the first substrate defines each discharge space; and
      the space dividing members that are in contact with the first substrate, the space dividing members being each disposed between adjacent ones of the space forming members.

5. The device of claim 4, wherein the space forming members each form a hollow column on the first substrate, so that the discharge spaces each has a hollow column shape.

6. The device of claim 4, wherein the space dividing members each have a first width substantially equal to the first distance.

7. The device of claim 6, wherein the first width is in the range from about 2 mm to about 5 mm.

8. The device of claim 6, wherein the space forming members each have a second width larger than the first width.

9. The device of claim 8, wherein the second width is in the range from about 10 mm to about 12 mm.

10. The device of claim 4, wherein the connecting passages are apart from the first substrate.

11. The device of claim 10, wherein the connecting passages each have a length larger than a width of the respective space dividing members.

12. The device of claim 10, wherein each of the space dividing members includes corresponding one of the connecting passages.

13. The device of claim 10, wherein each of the space dividing members includes two or more connecting passages.

14. The device of claim 10, wherein the connecting passages are each apart from the first substrate at a second distance, and the space forming members are each apart from the first substrate at a third distance, the second distance being smaller than the third distance.

15. The device of claim 10, wherein the connecting passages are each disposed in a diagonal direction with respect to a longitudinal direction of the discharge spaces.

16. The device of claim 15, wherein the connecting passages each has an S-shape.

17. The device of claim 10, wherein the connecting passages are each disposed at a center portion in a longitudinal direction of the respective space dividing members.

18. The device of claim 4, wherein the electrodes are disposed on an exterior surface of the space forming members.

19. The device of claim 18, wherein the electrodes have a substantially identical width.

20. The device of claim 18, wherein the electrodes each have a varying width such that a width at a center portion of the electrodes is smaller than a width at a side portion of the electrodes.

21. The device of claim 1, wherein the body includes:
   a reflecting layer formed on the first substrate, the reflecting layer reflecting light generated from the discharge spaces; and
   a fluorescent layer formed on an inner surface of the respective discharge spaces.

22. A device for displaying images, comprising:
   a display panel that displays the images using an image signal, a driving signal and light;
   a light generating device that provides the light to the display panel, the light generating device including:
      a body having discharge spaces that generate light in response to a voltage signal, the discharge spaces being apart from each other at a selected distance;
      electrodes that provide the voltage signal to the discharge spaces, the electrodes being disposed at external portions, respectively, of the body; and
      space dividing members being each disposed between adjacent ones of the discharge spaces, the space diving members including connecting passages each of which connects adjacent ones of the discharge spaces in fluid communication; and an inverter that generates the voltage signal to the planar light generating device.

23. The device of claim 22, wherein the body includes:
   a first substrate; and
   a second substrate disposed on the first substrate, the second substrate including:
      space forming members that are disposed on the first substrate and have a shape such that each space forming member and the first substrate defines each discharge space; and the space dividing members that are in contact with the first substrate, the space dividing members being each disposed between adjacent ones of the space forming members.

24. The device of claim 23, wherein the space dividing members each have a first width substantially equal to a distance between adjacent ones of the discharge spaces.

25. The device of claim 24, wherein the space forming members each has a second width that is larger than the first width.

26. The device of claim 23, wherein the connecting passages are apart from the first substrate.

27. The device of claim 26, wherein the connecting passages each has a length larger than a width of the respective space dividing members.

28. The device of claim 26, wherein the connecting passages are each apart from the first substrate at a first distance, and the space forming members are each apart from the first substrate at a second distance, the first distance being smaller than the second distance.

29. The device of claim 26, wherein the connecting passages are each disposed in a diagonal direction with respect to a longitudinal direction of the discharge spaces.

30. The device of claim 29, wherein the connecting passages each has a curved shape.

31. The device of claim 22, wherein the electrodes each has a varying width such that a width at a center portion of the electrodes is smaller than a width at a side portion of the electrodes.

32. The device of claim 22, wherein the body includes:
a reflecting layer formed on the first substrate, the reflecting layer reflecting light generated from the discharge spaces; and
a fluorescent layer formed on an inner surface of the respective discharge spaces.

33. The device of claim 22, further including:
a container that receives the light generating device;
an optical member disposed between the container and the display panel; and
a fixing member that securely holds the display panel in the container.

34. The device of claim 33, wherein the optical member includes:
a diffusion plate disposed on the light generating device, the diffusion plate diffusing the light generated from the light generating device; and
a brightness enhancement sheet that condenses the light from the diffusion plate toward the display panel.

35. The device of claim 22, wherein the electrodes include first and second electrodes, and the inverter provides first and second voltage signals to the first and second electrodes, respectively, the first and second voltage signals having a substantially identical level and phases opposite to each other.

* * * * *